May 28, 1968
R. L. LEONARD ET AL
3,385,059
HYPERLINEAR HYDROSTATIC POWER TRANSMISSION
SYSTEM HAVING BOTH LINEAR AND HYPERBOLIC
CHARACTERISTICS
Filed Oct. 12, 1966
9 Sheets-Sheet 1
Fig.1A
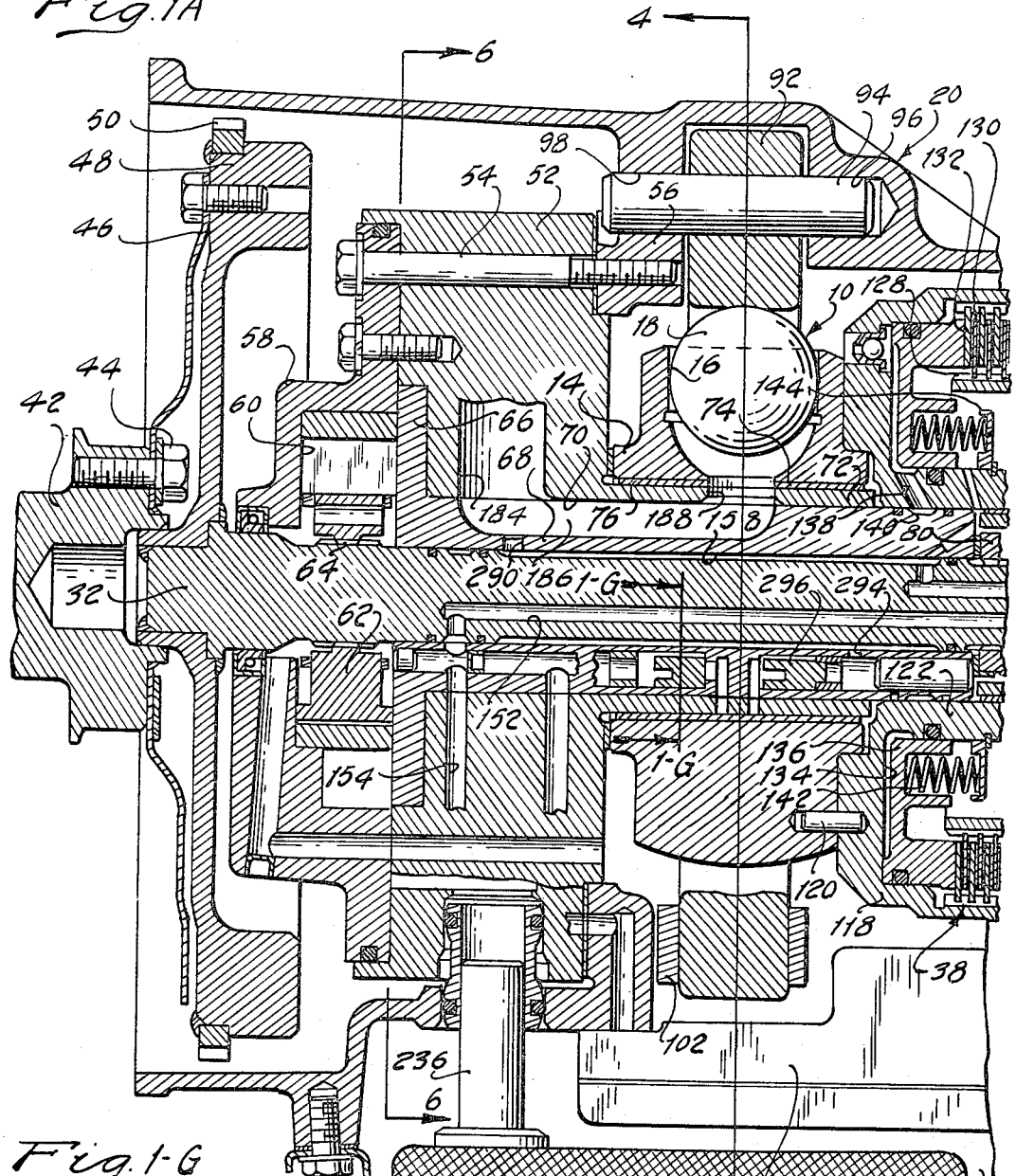
Fig.1-G
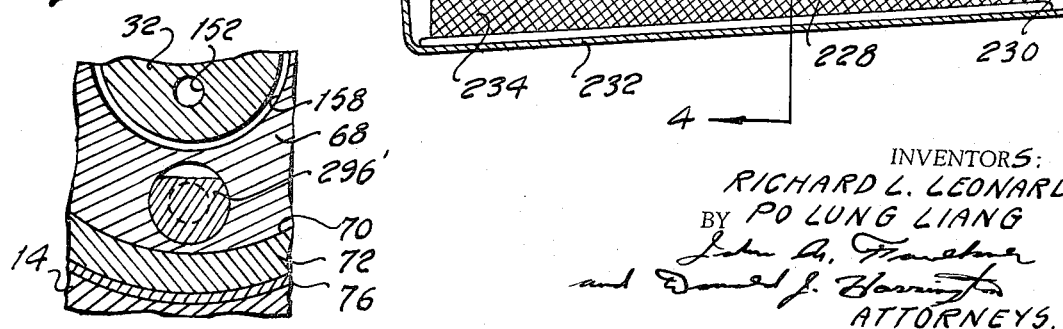
INVENTORS:
RICHARD L. LEONARD
BY PO LUNG LIANG
ATTORNEYS.

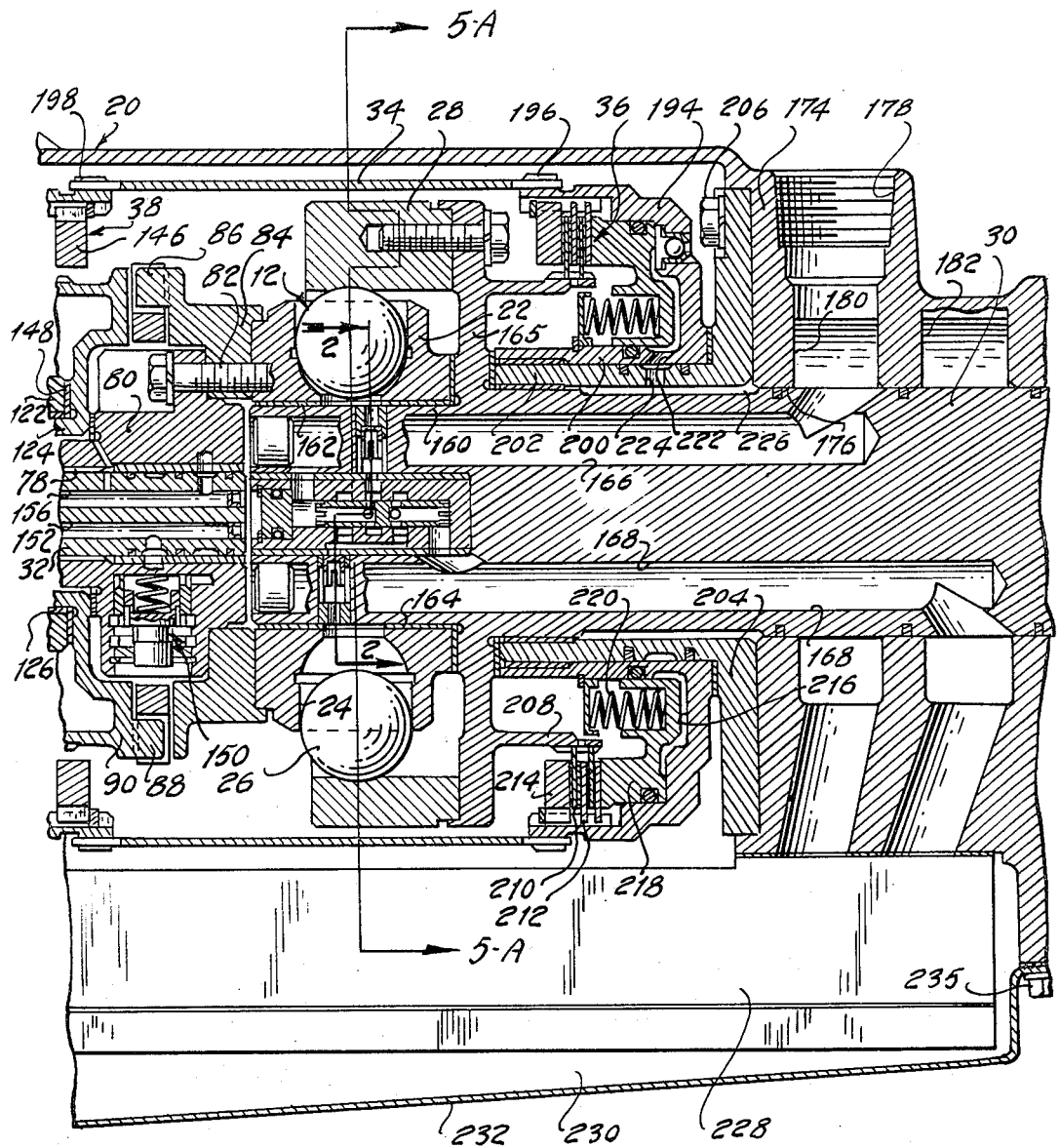

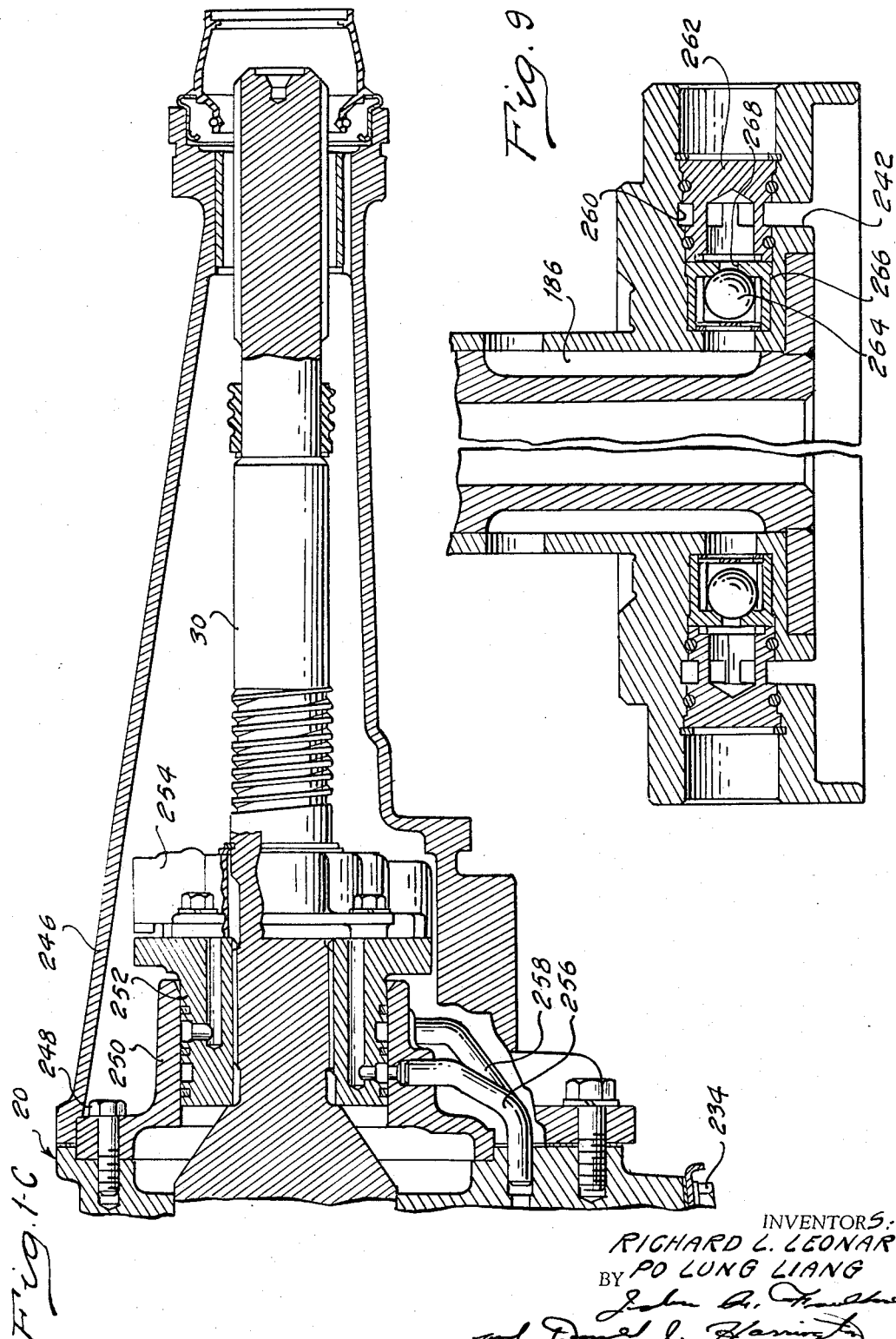

Fig. 1-D
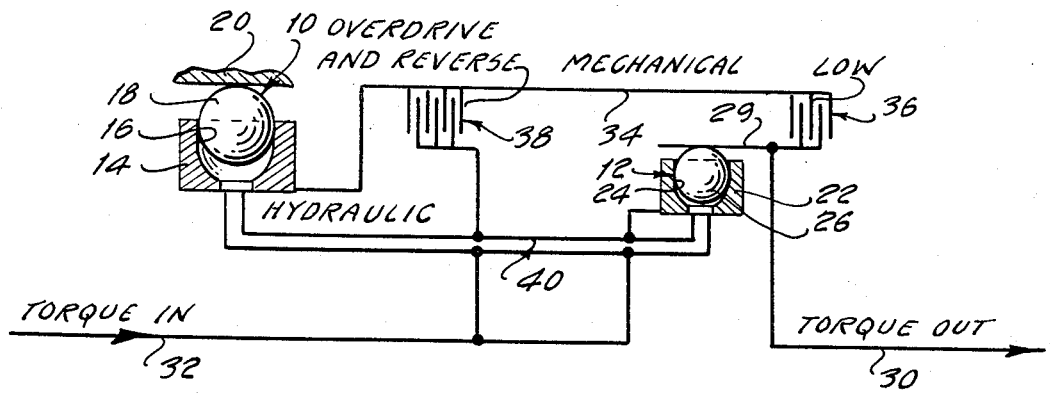
Fig. 1-E
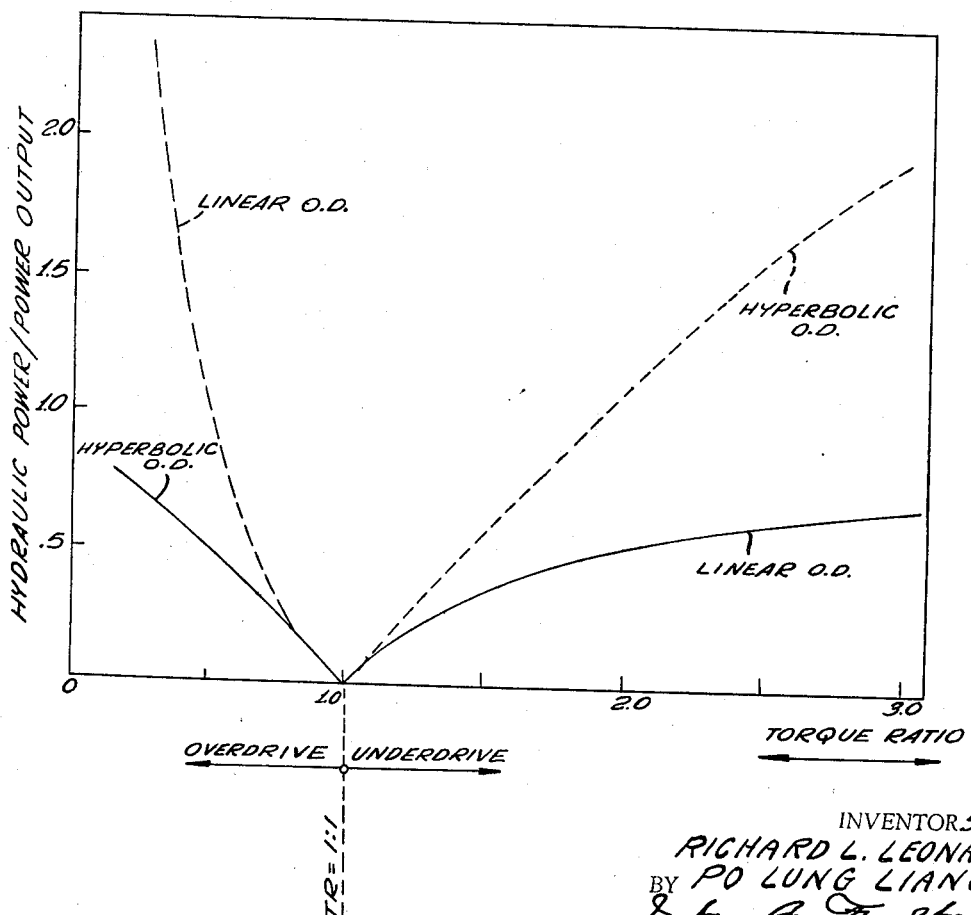
INVENTORS:
RICHARD L. LEONARD
BY PO LUNG LIANG
ATTORNEYS.

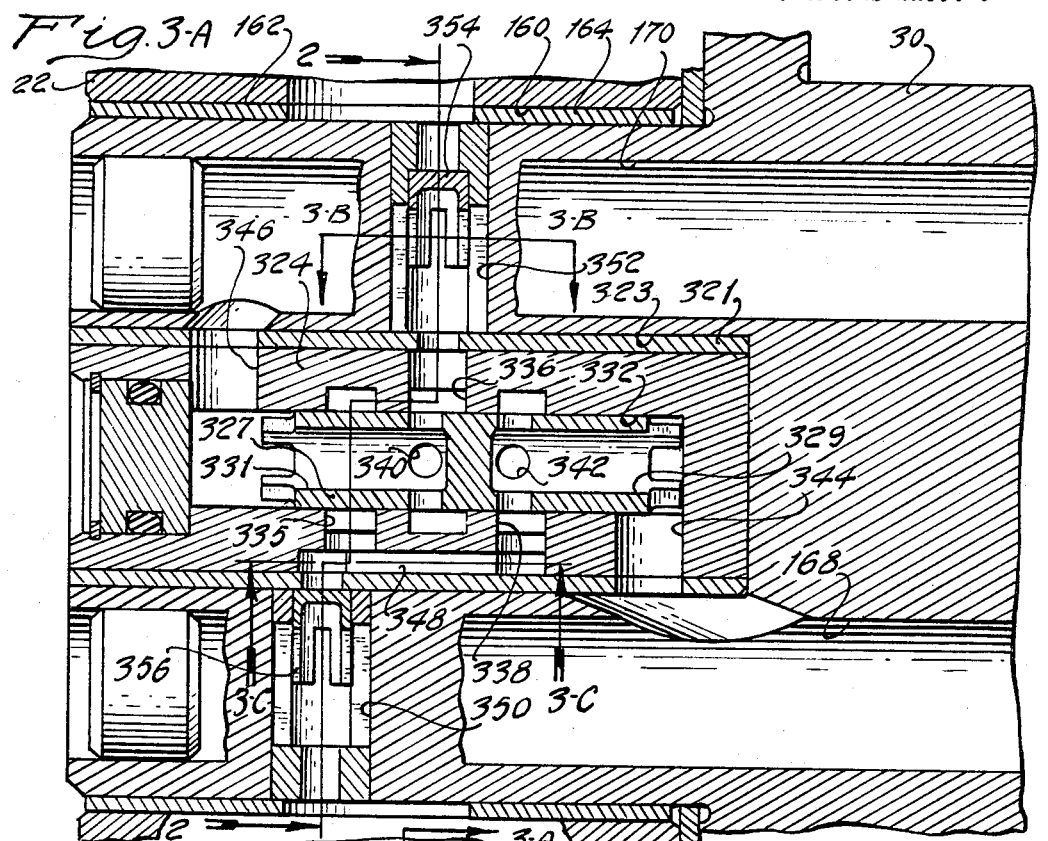
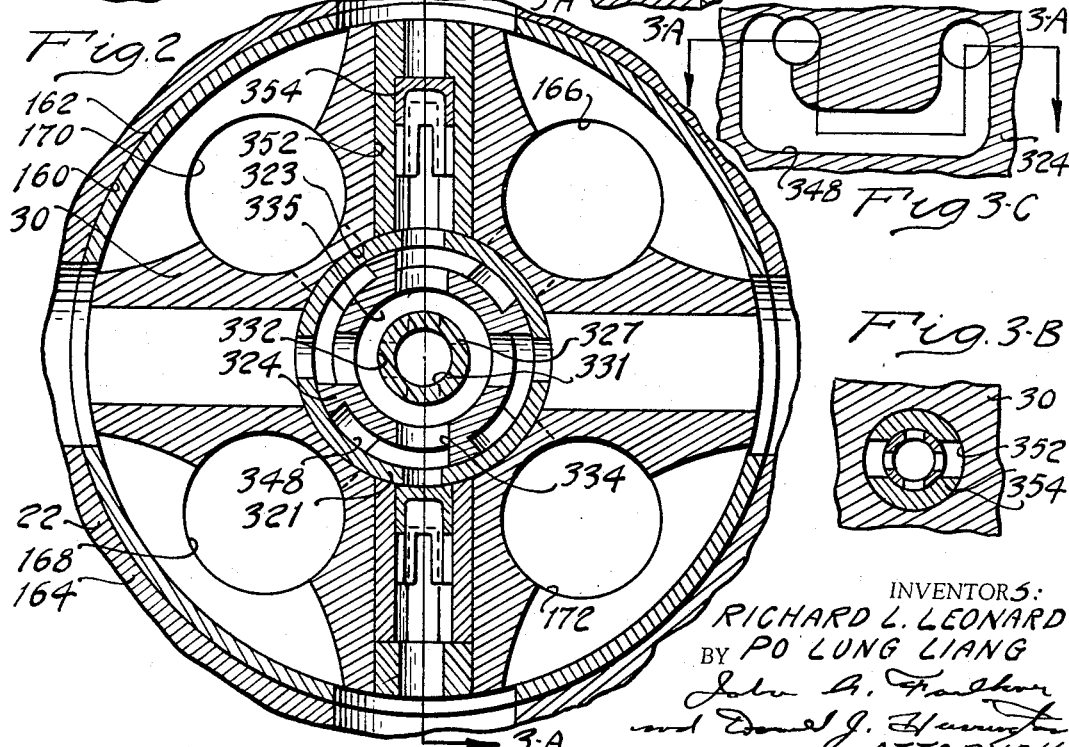

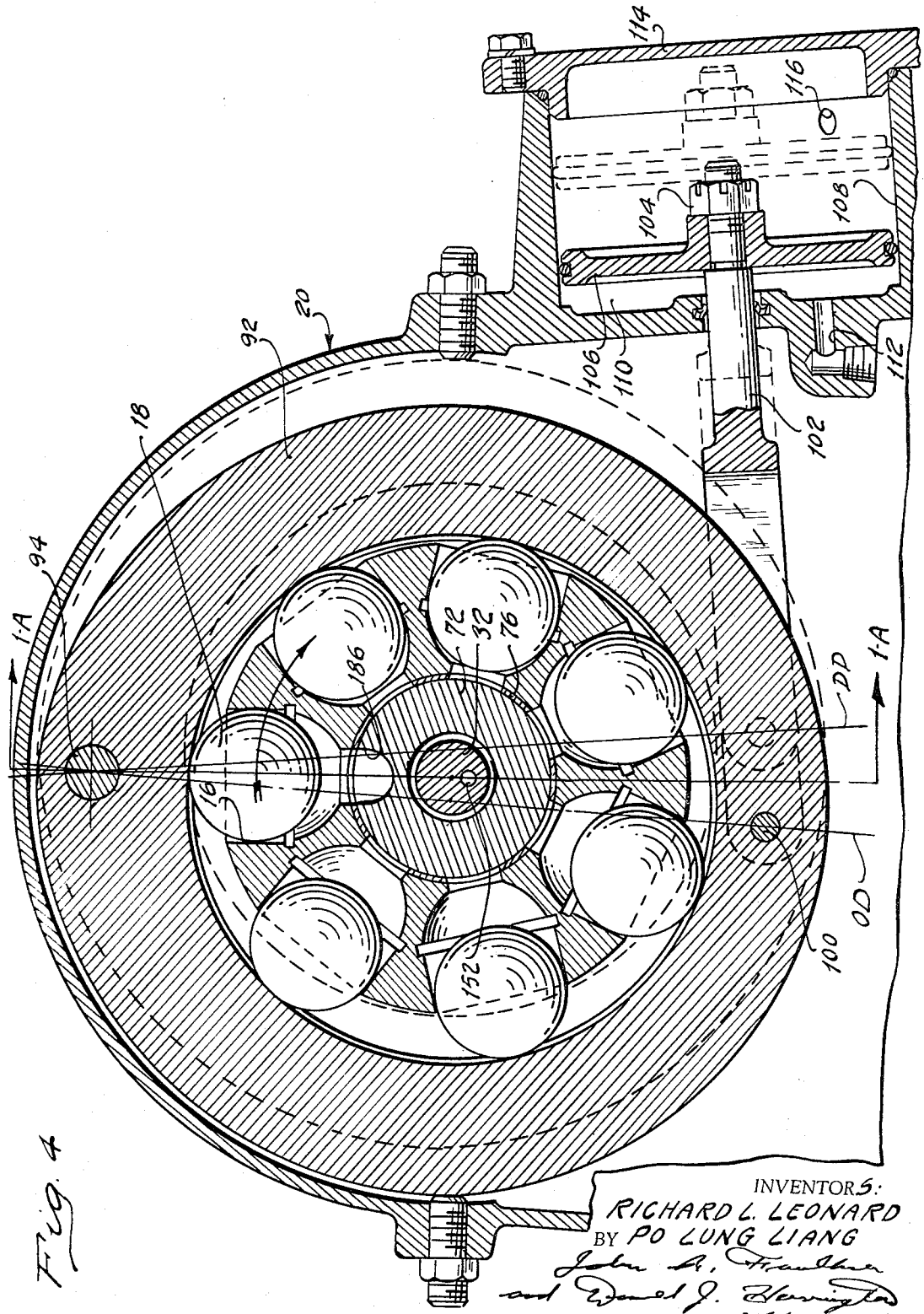

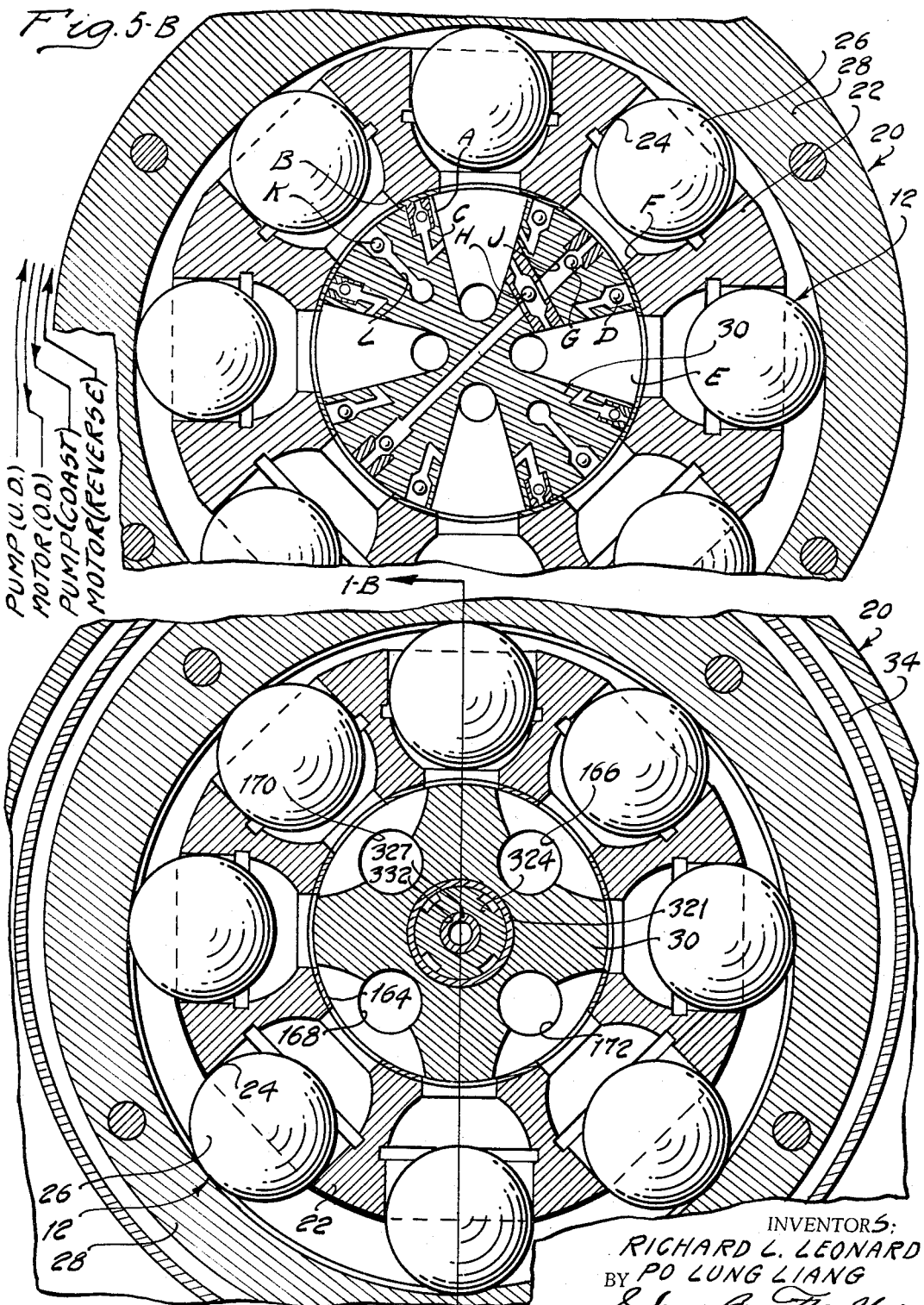

INVENTORS:
RICHARD L. LEONARD
BY PO LUNG LIANG
ATTORNEYS.

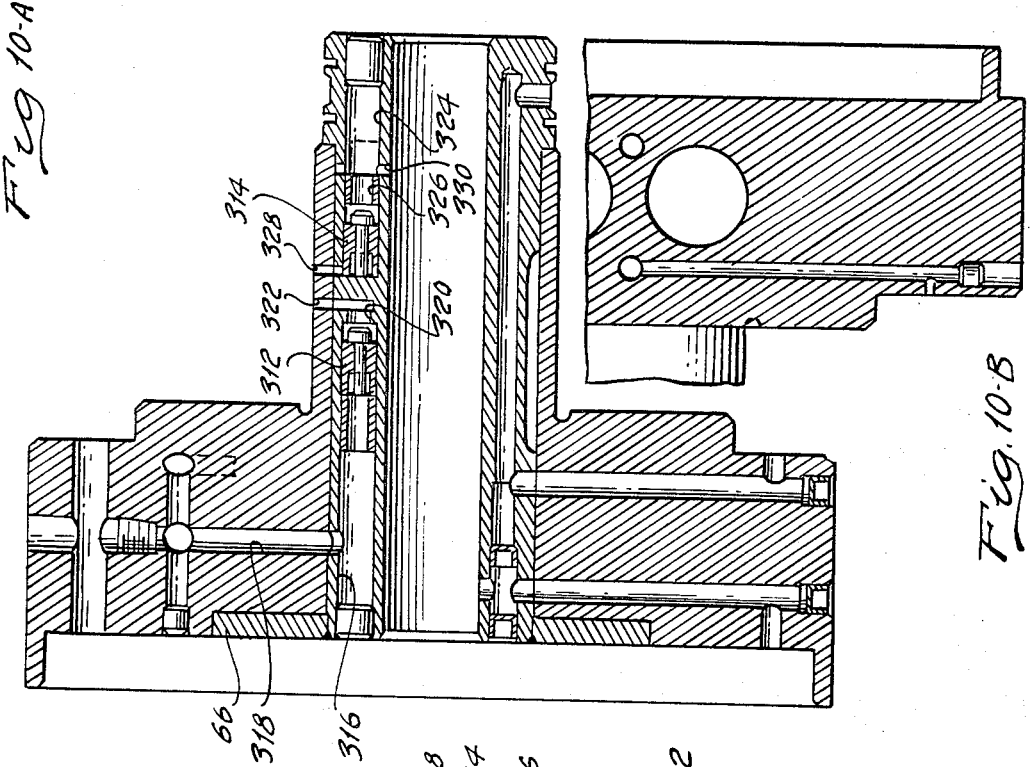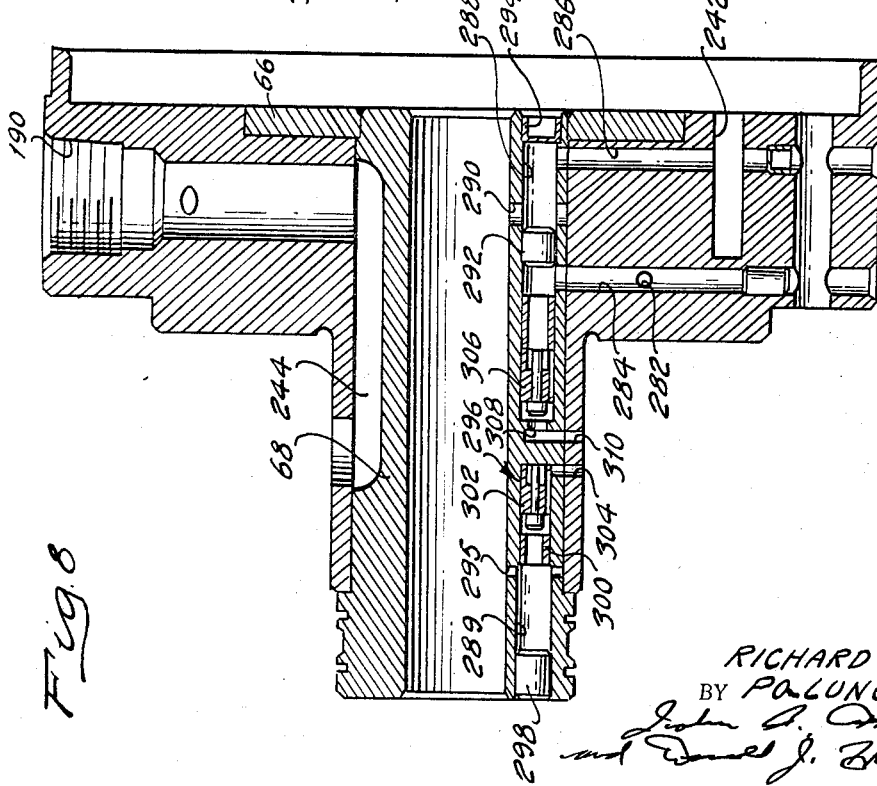

United States Patent Office 3,385,059
Patented May 28, 1968

1

3,385,059
HYPERLINEAR HYDROSTATIC POWER TRANSMISSION SYSTEM HAVING BOTH LINEAR AND HYPERBOLIC CHARACTERISTICS
Richard L. Leonard, Farmington, and Po-lung Liang, Lincoln Park, Mich., assignors to Ford Motor Company, Dearborn, Mich., a corporation of Delaware
Filed Oct. 12, 1966, Ser. No. 586,284
15 Claims. (Cl. 60—53)

Our invention relates generally to hydrostatic power transmission systems having hydrostatic pump and motor units situated in a closed hydraulic circuit. It relates more particularly to a power transmission system for delivering torque from a driving member to a driven member through a hydrostatic pump and motor system capable of providing a split torque delivery path with both an overdrive ratio and an underdrive ratio.

In a preferred form of our invention provision is made for varying the relative displacements of the two hydrostatic units in the system thereby providing an infinite variation in over-all torque ratio. The elements of each unit are arranged to provide a torque delivery path that is partially mechanical and partially hydrostatic. Because the hydrostatic portion of the system does not accommodate all of the torque that is delivered to the driven member, the over-all efficiency is increased.

The mode of cooperation of the elements of each of the units with respect to each other and with respect to the driving and driven members can be changed by engaging and disengaging a pair of selectively engageable friction clutches that form a part of the torque delivery paths. In this way the same hydrostatic units can be made to function with a so-called linear characteristic as well as a so-called hyperbolic characteristic. But regardless of which characteristic is chosen, an infinite variation in over-all torque ratio can be achieved by varying the displacement of one unit with respect to the displacement of the other. The variable displacement unit is arranged so that its torque reaction during operation is distributed directly into a relatively stationary casing.

The provision of a transmission system of the type above set forth being an object of our invention, it is a further object of our invention to provide a hydrostatic transmission system which is adapted to operate during a portion of its torque ratio range with a linear characteristic and to operate during the other part of the torque ratio range with a hyperbolic characteristic. In this way the most desirable features of a linear hydrostatic system can be combined with the most desirable features of a hyperbolic transmission system.

It is a further object of our invention to provide a hydrostatic power transmission mechanism of the type above set forth wherein the hydrostatic units are adapted to operate with a hyperbolic characteristic during overdrive operation and which are caused to operate with a linear characteristic during underdrive operation. It is known that a hydrostatic system having a linear characteristic is relatively inefficient during overdrive operation and that a hyperbolic system is relatively inefficient during underdrive operation. We contemplate, therefore, that the inefficient portion of each of the two operating zones can be eliminated, thereby making it possible to enjoy the advantages for each type of torque delivery system.

It is another object of our invention to provide a hydrostatic unit for use in a system of the type above described wherein a shift from one operating zone to the other can be achieved simply by engaging and disengaging a pair of selectively engageable friction clutches by means of which the mode of operation of the rotary por-

2 tions of each of the two hydrostatic units can be changed to produce selectively either a linear or a hyperbolic driving relationship between them.

It is a further object of our invention to provide a hydrostatic unit having positive displacement pumping elements situated in a pump rotor. It is formed with inlet and outlet ports which communicate with the pressure chamber defined by the rotor and pump elements, and wherein provision is made for equalizing the pressure in the pumping chambers with respect to the pressure in the ports prior to the instant that the pumping chambers are brought into communication with the ports.

It is another object of our invention to provide a hydrostatic unit of the type above set forth wherein the pump rotor is formed with a pre-expansion valve arrangement for reducing the pressure in the rotor chambers to a value corresponding to the value in the low pressure port as the rotor is rotated with respect to the ports.

It is a further object of our invention to provide a hydrostatic unit having a rotor and pumping elements which define plural pumping chambers and which include precompression valve means for pressurizing the pumping chambers so that they are charged with a pressure substantially equal to the pressure in the outlet port at a time prior to the instant when the chambers are brought into communication with the outlet port as the rotor is rotated with respect to the ports.

It is a further object of our invention to provide a hydrostatic unit in which provision is made for reducing or eliminating noise as pressure is raised from a low value to a higher value upon rotation of the pump rotor with repect to its ports.

Further objects and features of our invention will become apparent from the following description and from the accompanying drawings wherein:

FIGURES 1A, 1B, and 1C show in longitudinal cross-sectional form a hydrostatic power transmission assembly embodying improvements of our invention. FIGURE 1A is viewed from the plane of section line 1A—1A of FIGURE 4 and FIGURE 1B is viewed from the plane of section line 1B—1B of FIGURE 5A;

FIGURE 1D is a schematic illustration of the transmission system of FIGURES 1A, 1B, and 1C;

FIGURE 1E is a plot of the performance of our transmission;

FIGURE 1G is a partial sectional view as seen from the plane of section line 1G—1G of FIGURE 1A;

FIGURE 2 is a cross-sectional view taken along the plane of section line 2—2 of FIGURE 3A;

FIGURE 3A is a cross-sectional viw taken along the plane of section line 3A—3A of FIGURE 2;

FIGURE 3B is a sectional view taken along the plane of section line 3B—3B of FIGURE 3A;

FIGURE 3C is a sectional view taken along the plane of section line 3C—3C of FIGURE 3A;

FIGURE 4 is a partial cross-sectional view taken along the plane of section line 4—4 of FIGURE 1A. It shows an adjustable race for a variable displacement hydrostatic unit;

FIGURE 5A is a cross-sectional view as seen from the plane of section line 5A—5A of FIGURE 1B;

FIGURE 5B is a schematic assembly drawing showing one form of hydrostatic unit having pre-compression and pre-expansion valve elements in the rotor;

FIGURE 8 is a cross-sectional view taken along the plane of section line 8—8 of FIGURE 6;

FIGURE 9 is a cross-sectional view taken along the plane of section line 9—9 of FIGURE 6;

FIGURE 10A is a cross-sectional view taken along the plane of section line 10A—10A of FIGURE 6; and, FIGURE 10B is a cross-sectional view taken along the plane of section line 10B—10B of FIGURE 6.

Figure 7:
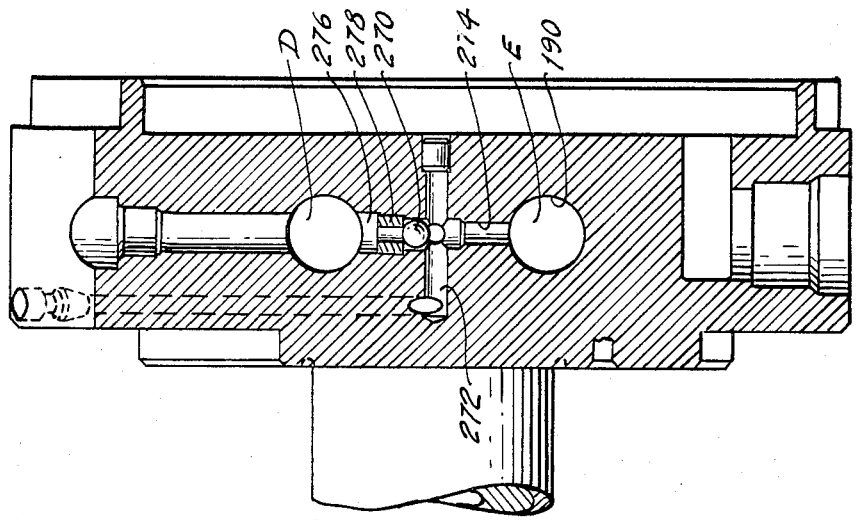
FIGURE 7 is a cross-sectional view taken along the plane of section line 7—7 of FIGURE 6.

In FIGURE 1A numeral 10 indicates generally a positive, variable displacement, hydrostatic unit. Numeral 12 in FIGURE 1B designates a positive, fixed displacement, hydrostatic unit. Unit 10 includes a rotor 14 having formed therein a plurality of radially disposed bores or cylinders 16 in each of which there is situated a pumping element in the form of a steel ball 18. The balls 18 are adapted to react against the transmission casing 20.

The second hydrostatic unit 12 includes a rotor 22 having a plurality of radial cylinders 24 which receive pumping elements in the form of steel balls 26. These engage a reaction bearing ring 28 which surrounds the rotor 22. Bearing ring 28 is connected directly to power output shaft 30. The rotor 22 is connected directly to power input shaft 32 which in turn can be connected drivably to the crankshaft of an internal combustion engine in an automotive vehicle driveline. The power output shaft 30 in turn can be connected to the vehicle traction wheels through a suitable driveline system.

The rotor 14 of the hydrostatic unit 10 is connected directly to a torque transfer drum 34. The reaction ring 28 is connected selectively to the drum 34 by means of a controllable friction clutch 36. This clutch is engaged during low speed ratio operation, as will be explained subsequently.

The power input shaft 32 is adapted to be connected selectively to the torque delivery drum 34 by means of a controllable friction clutch 38. This clutch is engaged during both overdrive operation and reverse operation.

Internal passage structure indicated schematically in FIGURE 1D at 40, connects hydraulically the hydrostatic unit 10 to the hydrostatic unit 12 to form a closed fluid circuit. The hydrostatic units 10 and 12 are adapted to transfer torque hydrostatically between shafts 32 and 30 with one unit acting as a motor and the other unit acting as a pump. The fluid displaced by the pump is received by the motor and then returned by the motor back to the intake side of the pump.

During overdrive operation hydrostatic unit 10 acts as a pump and hydrostatic unit 12 acts as a motor. When the system is operating with an underdrive ratio, however, hydrostatic unit 10 acts as a motor while the hydrostatic unit 12 acts as a pump. The function of the hydrostatic units changes from one to the other as the direction of the torque delivery through the system changes. We have assumed here, however, that torque is delivered from the engine through the shaft 32 and through the hydrostatic system to the power output shaft 30.

To establish low speed ratio operation, it is desirable to condition the mechanism for linear operation. To do this the clutch 36 is engaged thereby connecting directly the rotor 14 to the reaction ring 28. A regenerative split torque delivery path is established as torque is delivered mechanically from shaft 32 through the hydrostatic unit 12 to the power output shaft 30. A hydrostatic torque delivery path is established between the units 10 and 12 through the internal passages 40. The unit 12 acts as a pump and, during underdrive, drives a rotor 14. The pump elements 18 react against the casing. The torque thus delivered to the rotor 14 hydrostatically is transferred through the drum 34 and through the clutch 36 to the power output shaft 30.

As the displacement of the hydrostatic unit 10 is varied from a relatively large displacement to a small displacement per revolution, the underdrive ratio decreases and approaches a value of 1:1. If the displacement of unit 10 is varied still further with respect to the displacement of hydrostatic unit 12, the system will assume an overdrive condition with shaft 30 being driven faster than the shaft 32. Under these conditions hydrostatic unit 12 acts as a motor and unit 10 acts as a pump.

The regenerative torque delivery path to the hydrostatic circuit during overdrive operation is relatively inefficient when the system is operating linearly. At that time the torque ratio is equal to the sum of displacements divided by the displacement of the constant displacement unit. This is expressed as follows:

$$TR = \frac{Dc + Dv}{Dc}$$

Provision is made, therefore, for interrupting the linear function and substituting a hyperbolic function. This is done by disengaging the clutch 36 and engaging the clutch 38, thereby causing the rotor 14 to be driven by the engine as well as by the rotor 22. The effective over-all torque ratio for the hydrostatic system then can be expressed by the hyperbolic function:

$$TR = \frac{Dc}{Dc + Dv}$$

The relationship between the power distributed hydrostatically and the torque ratio is illustrated by the curve of FIGURE 1E. When the ratio is 1:1, the portion of the power distributed hydrostatically is zero. The hyperbolic portion of the curve in the hyperbolic-overdrive range is appropriately labeled. This represents a substantially smaller loss than that which exists during linear-overdrive operation which is illustrated by means of a dash line in linear-overdrive operating zone.

The inefficient relationship for linear-overdrive operation which appears to the left in the chart of FIGURE 1E and the inefficient relationship for hyperbolic-underdrive operation which appears to the right are avoided by changing the characteristics of the system so that it operates linearly in the underdrive range and hyperbolically in the overdrive range.

The structure shown in FIGURES 1A, 1B, and 1C includes an internal combustion engine crankshaft 42, which is bolted at 44 to a flexible drive plate 46. Plate 46 is secured to the periphery of a flywheel 48 which carries a starter ring gear 50.

The hub of flywheel 48 is connected directly by means of welding to the left-hand end of shaft 32. A support wall 52 is secured by means of bolts 54 to an internal shoulder or flange 56 formed in the housing 20. A supercharge pump housing 58, secured to the left-hand side of the wall 52, defines a pump cavity 60 within which is positioned a positive displacement supercharge pump rotor 62. This rotor is splined at 64 to the shaft 32 so that it is driven by the engine. Secured also to the housing wall 52 is the flanged end 66 of a fluid pressure distributor sleeve 68. The sleeve extends within a central opening 70 formed in the wall 52. It extends also through a sleeve shaft extension 72 which provides a so-called pintle bearing support for the rotor 14. The rotor 14 is journalled in the support sleeve 72 by bushings 74 and 76.

Shaft 32 extends through the sleeve 68 and is splined at 78 to a coupling member 80 which in turn is bolted by bolts 82 to the rotor 22 of the hydrostatic unit 12.

Secured also to the coupling member 80 is a positive acting clutch element 84. It carries clutch teeth 86 which engage cooperating dog clutch teeth 88 carried in turn by a clutch element 90. The teeth 86 and 88 form an articulated joint which establishes a driving connection between the members 84 and 90.

The articulated joint is adapted to accommodate misalignments between members 84 and 90 during operation. Such misalignments might occur, for example, due to the deflections in the support structure for the hydrostatic units relative to each other as they are operated under high hydrostatic pressures.

The balls 18 of he hydrostatic unit 10 engage a cam ring 92 which surrounds the rotor 14. It is mounted in place by a mounting pin 94 which in turn is anchored to the transmission housing 20. The ends of the pin 94 are received within openings 96 and 98 formed in an internal shoulder for housing 20 and in the shoulder 56, respectively.

As best seen in FIGURE 4, the lower end of the cam ring 92 is secured by means of a pin 100 to adjusting link 102. One end of the link 102 is connected by means of a threaded connection 104 to a servo piston 106 slidably received within a fluid cylinder 108 for a ratio adjusting servo. The cylinder 108 forms a part of the transmission housing 20.

The cylinder 108 and the piston 106 cooperate to define a pressure chamber 110. Fluid pressure can be admitted to the chamber 110 through a feed passage 112 formed in the housing 20.

The right-hand end of the chamber 108, as viewed in FIGURE 4, is closed by closure plate 114. A second feed passage 116 permits the distribution of servo pressure to the right-hand side of the piston 106. Thus the position of the reaction ring 92 with respect to the fixed pivot pin 94 can be controlled by appropriately distributing pressure to each side of the piston 106. In the position shown in FIGURE 4, the ring 92 is in an overdrive position. The direct drive position corresponds to the reference line extending from the pin 94 in a vertical direction.

A friction clutch drum 118 is pinned, as shown at 120, to the rotor 14. It includes a hub 122 which is journalled for rotation about sleeve 68. The coupling member 90 includes a hub 124, which is journalled by means of a bushing 126 within the hub 122. Member 90 includes an externally splined clutch element 128 which carries internally splined clutch discs 130. These cooperate with externally splined clutch disc 132 carried by an internally splined portion of the drum 118. Drum 118 defines an annular cylinder 134 within which is positioned an annular piston 136. Cylinder 134 and piston 136 cooperate to define a pressure cavity that is in fluid communication with the pressure feed passage 138, which in turn communicates with a supply pressure groove 140 formed in the sleeve 68.

A return spring 142 acts upon the piston 136 and is anchored against a spring seat 144 carried by the hub 122.

Drum 119 carries a clutch disc reaction ring 146 which is held in place by a snap ring. Thus when pressure is distributed to the working chamber defined in part by the piston 136, the piston 136 will cause the clutch disc 130 and 132 to frictionally engage, thereby establishing a driving connection between rotor 14 and clutch member 90. When working pressure is relieved from behind the piston 136, spring 142 returns the piston 136 to a clutch disengaging position. A thrust washer 148 is situated between the hub 122 and the coupling element 90.

Member 80 serves as a governor body and includes a fluid pressure governor valve mechanism 150 situated in a radial opening formed in the member 80. This mechanism 150 includes centrifugally responsive valve elements which rotate with shaft 32. It distributes a governor pressure signal through a pressure passage 152 formed in shaft 32. This passage communicates with a valve body located in the housing portion 52, a branch passage 154 being provided for this purpose, as indicated in FIGURE 1A. A lubrication oil passage 156 also is formed in shaft 32 and communicates with various lubrication points as indicated. It communicates also with an annular passage 158 defined by the shaft 32 and its surrounding sleeve 68. Lubrication oil pressure is supplied to this annular passage through an internal lube oil passage formed in the body 52.

Rotor 22 surrounds the left-hand end 160 of the power output shaft 30. It is journalled on the end 160 by bushings 162 and 164. Shaft 30 is formed with a radially extending flange 165 which carries the cam ring 28. Cam ring 28 is eccentrically positioned with respect to the axis of shaft 30 so that when shaft 30 and rotor 22 rotate with respect to each other, the balls 26 will reciprocate within the radial opening 24, thereby establishing a pumping action.

The rotor 22 is radially ported, and the radial ports communicate with porting formed in the end 160 of the shaft 30. These radial ports communicate with axially extending pressure conduits formed in the shaft 30, as indicated best in FIGURE 4 at 40. The unit 12 is a double stroke unit, and thus there are two high pressure passages and two low pressure passages in shaft 30. Passage 166 for one part of the pumping cycle is a high pressure passage and passage 168 is a corresponding high pressure passage for the other side of the pumping cycle. The respective low pressure passages are identified in FIGURE 2 by reference characters 170 and 172. FIGURE 2 shows the arcuate porting formed in the end 160. One side of the double acting pump includes a high pressure port and a low pressure port, and the other side of the double acting pump includes two additional corresponding ports.

Housing for casing 20 includes an end wall 174 having an opening 176 through which shaft 30 extends. It is ported at 178 to provide communication with passage 166. Such communication is formed by an annular groove 180 surrounding the shaft 30. Passage 168 communicates with an annular groove 182 formed in the wall 174 and surrounding the shaft 30. Port 178 communicates by means of a suitable fluid pressure delivery conduit, not shown, with a passage 184 formed in the body 52 as seen in FIGURE 1A. That passage in turn communicates with passage 186 shown in FIGURE 1A and also in FIGURE 6. Passage 186 in turn communicates with the high pressure port 188 of the hydrostatic unit 10.

Figure 6:
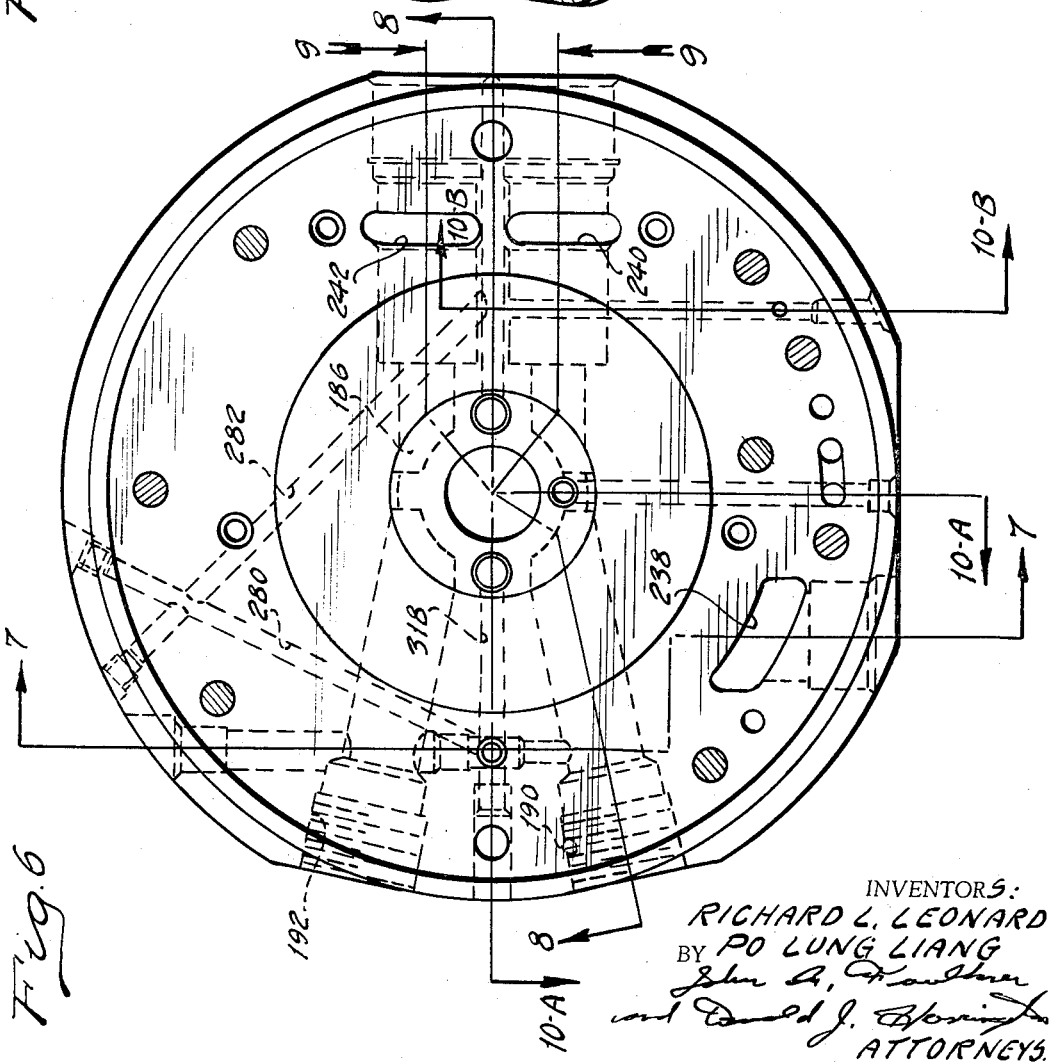
FIGURE 6 is a cross-sectional view taken along the plane of section line 6—6 of FIGURE 1A.

Annular groove 182 communicates with an external port and an external fluid pressure delivery passage, not shown, which communicates with the other side of the variable displacement unit 10. This external passage is connected to a port 190 as seen in FIGURE 6. Port 178, on the other hand, is connected through its corresponding pressure delivery passage with port 192 shown in FIGURE 6.

The friction disc clutch assembly 36 comprises a clutch drum 194, which is keyed at its periphery 196 to the drive drum member 34. The other end of the drum member 34 is keyed at 198 to the cylinder 118 of the multiple disc clutch assembly 38.

The hub 200 of the cylinder drum 194 is journalled for rotation upon a sleeve 202 which extends from a support 204. This in turn is bolted by bolts 206 to the end wall 174.

The friction disc clutch assembly 36 includes a clutch element 208 carried by the member 165. It is internally splined to support internally splined clutch disc 210 situated adjacent externally splined clutch discs 212 carried by an internally splined periphery of the cylinder 194. A reaction ring 214 also is carried by the cylinder 194 adjacent the friction discs.

Cylinder 194 defines an annular pressure chamber 216 within which is positioned an annular piston 218. Piston 218 is urged by spring 220 to an inactive position. Pressure can be distributed to the pressure chamber 216 through ports 222 and 224 formed in the hub 200 and in the sleeve 202. These ports in turn communicate with an annular passage 226 which communicates with the valve body shown in elevation at 228. This valve body is located within a sump region 230, the lower part of which is defined by an oil pan 232 bolted by means of bolts 234 to the housing 20.

An oil filter screen 234 is located at the inlet conduit 236 for the supercharge pump shown in part at 62. This conduit communicates with supercharge inlet port 238 shown in FIGURE 6.

Shown also in FIGURE 6 is a pair of outlet ports 240 and 242 for the supercharge pump shown in part at 62.

Port 242 communicates with the port 192 and port 240 communicates with port 190. Port 192, as mentioned previously, is engaged with passage 186. Port 190 communicates with the other side of the hydrostatic system and more particularly with passage 244, as shown in FIGURE 8.

Supercharge pump pressure from port 242 is distributed through radial passage 286, as viewed in FIGURE 8. This passage communicates with a longitudinally extending chamber 288 formed in the body extension 68. This pressure is distributed through chamber 288 and through a port 290 into passage 158. Flow directing plugs 292 and 294 are located in the chamber 288 for this purpose.

Passage 158 communicates with a radial port 295, thus distributing pressure to the right-hand side of a pre-expansion valve 296. The end of chamber 289 is closed by a plug 298. A valve seat in the form of a sleeve 300 is situated directly adjacent a pre-expansion valve element 302. When the valve element 302 is shifted toward the sleeve 300, port 295 becomes sealed. When the valve element 302 is shifted in the other direction, however, communication is established between port 295 and a radial port 304, which communicates with passage 286.

A precompression valve 306 is slidably positioned in chamber 288. It is adapted to open and close a valve port 308 which in turn communicates with a radial port 310 that communicates with passage 284. The pressure in passage 282, which is always at a high value normally, closes the valve 306. Valve 306 is not unseated unless the pressure in passage 310 exceeds the pressure in passage 282. The pressure in port 304 normally will close valve element 302. But if the supercharge pressure in port 295 exceeds the pressure in port 304, the valve element 302 will open.

In FIGURE 10A we have illustrated the pressure equalizer valves. These are identified separately by reference characters 312 and 314. Valve 312 is a high pressure equalizer valve and valve 314 is a low pressure equalizer valve. Valve 312 is situated slidably within a valve chamber 316 which communicates with passage 318. This passage in turn communicates with a previously described passage 280 and is directed always to high pressure. Valve port 320 is closed by the valve element 312 when the latter is shifted in a right-hand direction. This interrupts communication between passage 318 and port 322. On the other hand, if the pressure in port 322 is greater than the pressure in passage 318, the pressure equalizer valve element 312 will shift in a left-hand direction to establish communication between passage 318 and port 312.

A low pressure equalizer valve 314 is situated in another valve chamber 324. It registers with a valve port 326 when it is shifted in a right-hand direction, thereby interrupting communication between port 328 and a supercharge pressure port 330. On the other hand, if the supercharge pressure in port 330 is greater than the pressure in port 328, the valve will shift in a left-hand direction, thereby causing supercharge pressure to be distributed to port 328. Both ports 322 and 328 communicate with the same pumping chamber of the hydrostatic unit during operation.

The hydrostatic unit 12 is a double-stroke unit. It also is provided with precompression and pre-expansion valves as well as pressure equalizer valves. But since there are two pumping cycles for each revolution of the rotor, two pairs of equalizer valves, two pairs of pre-compression valves and two pairs of pre-expansion valves are required. This valve assembly is situated in the power output shaft 30. A first valve sleeve 321, situated within a central opening 323 in the shaft 30, receives a valve insert 324 which in turn receives slidably an equalizer valve element 327. This valve element has two internal cavities 329 and 331. Element 327 is slidably positioned in valve opening 332.

Surrounding the valve element 327 are three valve grooves 334, 336 and 338. When the valve element 327 is positioned as shown in FIGURE 3, communication is established through port 340 between groove 336 and cavity 331. At the same time communication is established between groove 338 and cavity 329 through port 342. Another port 344 at the right-hand side of chamber 332 communicates with the low pressure side of the system. In this case this would be passage 172 shown in FIGURE 2.

Since member 166 is connected directly to the power output shaft 30, race 28 of hydrostatic unit 12 is connected to the rotor 14 for the hydrostatic unit 10 whenever the friction disc clutch 36 is applied by pressurizing chamber 216. This establishes a linear operation of hydrostatic units at which time the hydrostatic unit 12 acts as a pump and hydrostatic unit 10 acts as a fluid motor.

A tailshaft extension housing 246 is bolted by bolts 248 to the right-hand end of the housing 20. Bolts 248 also secure a distributor sleeve 250 within which is journalled a distributor element 252 splined to shaft 30. A governor body 254 is secured to the element 252. It contains centrifugal valve elements that sense the speed of rotation of the shaft 30 and develop a pressure signal that is distributed to the valve body 228 through conduit structure shown in part at 256. Control pressure is distributed to the governor body 254 through conduit structure shown in part at 258.

The hydrostatic unit 20 is a variable displacement unit. Transitions between overdrive and underdrive can be obtained by appropriately positioning the angularity of the race 92 with respect to the axis of pin 94. In FIGURE 4, the race 92 is shown in the overdrive position. The centerline drawn between the axes of pin 100 and pin 94 which correspond to the overdrive position is identified in FIGURE 4 by the symbol OD. The corresponding position of that centerline for the direct drive position is indicated by the reference character DD. Positioning the centerline on the right-hand side of the line DD shown in FIGURE 4 will produce an underdrive.

As the race moves from the overdrive position to the underdrive position, the mode of operation of the hydrostatic unit 10 will be transformed from a pumping operation to a motoring operation.

Shown in FIGURE 9 is a ball check valve that is associated with the outlet of supercharge or "fluid make-up" pump. The port 242, which communicates with the outlet of the supercharge pump, distributes supercharge pump outlet pressure to a valve cavity 260, as seen in FIGURE 9. This valve cavity is closed by a closure member 262, which is ported to admit pressure to the right-hand side of a ball valve element 264. This valve element is seated within a retainer or a cage 266 located in the left-hand end of the valve chamber 260. The cage defines a valve orifice 268, which is adapted to be opened and closed by the valve element 264 as it is shifted axially in the chamber 260.

The pressure in passage 186 acts upon the left-hand side of the valve element 264. If the pressure in passage 186 is of a high value, the valve element 264 will be seated against the valve seat surrounding the orifice 268, thereby preventing communication between the outlet side of the supercharge pump and the passage 186. On the other hand, if the passage 186, due to the particular mode of operation of the hydrostatic units, is at a low pressure, the supercharge pump will be effective to develop a pressure that will unseat the valve element 264, thereby charging the flow pressure side of the hydrostatic system.

There are two check valve assemblies of the type shown in FIGURE 9. Another identical check valve assembly, also seen in FIGURE 9, is located in FIGURE 6 just below port 242. This second valve assembly is associated with port 240 and is effective to establish total communication between the discharge side of the supercharge pump and the passage 244 shown in FIGURE 8. It functions in the same fashion as the other valve assembly shown in FIGURE 9, i.e., when the passage 244 is subjected to high pressure, its associated supercharge check valve will close, thereby preventing communication between the supercharge pump and the high pressure side of the hydrostatic system. When passage 244 is subjected to a low pressure, however, the supercharge pump is effected to charge the low pressure side of the hydrostatic system by distributing make-up fluid to the passage 244. This maintains a minimum circuit pressure minimal in the system.

Shown in FIGURE 7 is a ball check valve that functions as a pressure distributor for the equalizer valve subsequently to be described. This check valve includes a valve element 270 situated at the inner section of passages 272, 274 and 276. Situated in passage 276 is a sleeve 278, which forms a valve seat for the valve element 270. A reduced diameter portion of passage 274 acts as another valve seat for the valve element 270. When the pressure in passage 190 is higher than the pressure in passage 192, the valve element 270 assumes the position shown, thereby blocking communication between passage 272 and passage 276 and opening communication between passage 274 and passage 272. Thus passage 272 is pressurized with the high pressure exiting in passage 190. On the other hand, if passage 192 is pressurized with a pressure that is higher than the pressure in passage 190, valve element 270 will be shifted in a downward direction, as viewed in FIGURE 7, thereby interrupting communication between passage 274 and passage 272 and establishing communication between passage 276 and passage 272. Thus passage 272 becomes pressurized with the high pressure that exists in passage 192. Therefore, it is apparent that passage 272 always will be subjected to a high pressure. That pressure is equal to the pressure of the high pressure side of the hydrostatic system.

Passage 272 communicates with a passage 280 as viewed in FIGURE 6. This in turn communicates with passage 282. Thus the high pressure that always exists in passage 272 is distributed to radial passage 284 as seen in FIGURE 8. Similarly, the left-hand side of chamber 332 communicates with the high pressure side of the system. In this instance port 346 communicates with passage 166 shown in FIGURE 2. The valve element 326 will shift one way or the other depending upon whether port 344 or port 346 has the higher pressure. In this instance port 346, has the higher pressure and high pressure, therefore, is distributed to annular groove 336. At the same time annular groove 338 communicates with the low pressure side of the system by means of a suitable crossover passage 348.

The annular groove 338 communicates with the radially inward end of valve opening 350. The radially inward end of valve 352 communicates with the groove 336. It is apparent, therefore, that regardless of which position the valve element 326 assumes, the radially inward end of valve chamber 350 always will be subjected to low pressure and the radially inward end of valve chamber 352 always will be subjected to high pressure. The radially outward end of chamber 352 communicates with the high pressure port and the radially outward end of valve chamber 350 communicates with the low pressure port.

Valve chamber 352 receives an equalizer valve 354, and a similar equalizer valve 356 is received within valve chamber 350. When valve element 354 is moved to a radially outward position, it seals the high pressure port from groove 336, as indicated in FIGURE 3A. If the pressure in the high pressure port exceeds the pressure in port 336, the valve will move radially inwardly, thereby permitting the high pressure port to distribute higher pressure to the port 336 and equalize the pressure in the system. Similarly, if the valve element 356 moves radially inwardly, it will interrupt communication between the low pressure side of the system and the groove 338. This occurs whenever the pressure in groove 338 is less than the pressure in the low pressure side of the system. If a reversal in the relative pressure takes place, however, the valve element 356 will move radially outwardly, thereby establishing communication between groove 338 and the low pressure side of the system to equalize the pressures.

In order to provide a clear understanding of the function of the equalizer valves and the precompression valves and the pre-expansion valves, reference can be made to FIGURE 5B where these valves have been illustrated schematically in the form of check valves. Their functions, however, are the same as the sliding valves of the disclosed preferred embodiment. The direction of rotation of the rotor with respect to the output shaft has been indicated by means of directional arrows for each condition of operation. If it is assumed that the unit is acting as a pump and is driving during underdrive, precompression valve A will open as the pumping chamber radial port B uncovers it. This occurs prior to the time that port B uncovers high pressure port C. Thus if the pressure in pumping chamber port B exceeds the pressure that already exists in high pressure port C at a time prior to the actual communication between port B and port C, valve A will allow the excess pressure to be distributed to the port C, thereby precompressing the latter. Pre-expansion valve D will establish communication between low pressure port E and pumping chamber port F at a time prior to the actual communication of port F with port E if the pressure in port E exceeds the pressure in port F. Thus the pressure becomes equalized before port F and its associated ball piston begin their intake stroke. In this way the pressures in the high pressure region of the system become equalized with the pressure in the pumping chambers of the hydrostatic unit before those pumping chambers actually come into communication with our respective high pressure ports. Similarly, the pressure in the low pressure ports of the system become equalized by the pressure in the pumping chambers before the pumping chambers actually begin their intake strokes. This equalization of pressures eliminates the pumping noise due to sudden pressure circuits and contributes to the over-all operating efficiency of the unit.

Pressure equalizer valve G communicates with either one pressure chamber or the other depending upon the position of shuttle valve H. After the port F seals the high pressure port H, the ball piston will not have reached its bottom-dead-center. Thus a residual amount of compression takes place. This can be relieved through the valve port. At that time valve H is shifted to establish communication between port C and radial passage J. Thus communication is prolonged between the pumping chamber of each of the servo pumping chambers and the high pressure port of which it has passed and sealed. This eliminates an undesirable hydraulic lock, which causes a pressure peak, which in turn contributes to considerable wear and pump noise. Passage J always is pressurized since it communicates always with the high pressure side of the system.

If it is assumed that port C is the high pressure port during operation under torque, and port E is the low pressure port, the shuttle valve H will establish communication between passage J and port C. On the other hand, during coasting and during operation in reverse, the relative pressures are reversed and port E becomes the high pressure while port C becomes the low pressure port. At that time the shuttle valve H will shift in the opposite direction to establish communication between passage J and port E. Valve G, however, functions in the same fashion regardless of whether port C or port E is considered to be the high pressure passage.

Valve K operates in the same fashion as supercharge check valve 264 shown in FIGURE 9. It communicates with the supercharge pump outlet passage through supercharge feed passage L. If the supercharge pressure is greater than the pressure in the pumping chamber with which the valve K communicates, the supercharge pump will be capable of supplying make-up fluid to the system.

In FIGURE 1E we have illustrated in graphic form the power absorbed in the system regeneratively during each condition of operation. If the unit functions as a linear unit and if the mechanism is conditioned for overdrive operation, it is seen that the hydraulic power losses will be considerable. On the other hand, the operation of the linear system in the underdrive range is relatively efficient due to the negative rate of change of slope of the characteristic curve. At 1:1 speed ratio, theoretically, the hydraulic power losses should be zero. This has been illustrated by placing the breakpoint for the two parabolic curves at the X axis.

The chart of FIGURE 1E illustrates also that the underdrive ratio for a hyperbolic system is inefficient as is the overdrive operation of a linear system. In order to effect a transfer from the underdrive operation to an overdrive operation, it thus is necessary to switch the system from a linear system to a hyperbolic system. This is done by engaging and disengaging the friction clutch assembly 36 in synchronism with the operation of the clutch assembly 38 in the manner described previously. The reaction for the hydrostatic power transmission mechanism in each instance is absorbed by the transmission casing.

Having thus described a preferred form of our invention, what we claim and desire to secure by U.S. Letters Patent is:

1. A hyperlinear power transmission mechanism having a pair of hydrostatic units situated in a closed hydrostatic circuit, each hydrostatic unit comprising a rotor, pumping elements mounted reciprocally in the rotor and a cam operator engaging said pumping elements, a driving member, a driven member, the cam operator for a first of said hydrostatic units being connected to a stationary portion of said mechanism, first clutch means for drivably connecting the cam operator for the second hydrostatic unit with the rotor for the first hydrostatic unit, second selectively engageable clutch means for connecting the rotor of said first hydrostatic unit with said driving member, said driving member being connected to the rotor of said second hydrostatic unit, said driven member being connected to the cam operator for said second hydrostatic unit, said pumping elements cooperating with their respective rotors to define a plurality of pumping chambers, and internal passage structure hydraulically connecting the chambers of one unit with the chambers of the other unit whereby said system can be adapted by engagement and disengagement of said clutches for operation with a linear characteristic during underdrive and with a hyperbolic characteristic during overdrive.

2. The combination as set forth in claim 1 wherein the cam operator for one of said hydrostatic units is mounted for shifting movement with respect to the axis of rotation of its respective rotor, and means for varying the displacement of said last-named cam operator with respect to said rotor to control the displacement of one hydrostatic unit with respect to the other.

3. The combination as set forth in claim 1 wherein the cam operator for said first hydrostatic unit comprises a cam ring pivotally mounted on a stationary portion of said mechanism and a fluid pressure operated servo means for adjusting said pivotally mounted cam operator with respect to the rotor of said first unit to vary the displacement of said first unit with respect to the displacement of the second unit, the displacement of said second unit being fixed.

4. The combination as set forth in claim 3 wherein said servo means is adapted to adjust the cam operator for said first unit throughout a range of angular positions with respect to the axis of the rotor of said first unit on each side of a position corresponding to the position at which the axis of symmetry of the cam operator coincides with the axis of symmetry of the rotor of said first unit.

5. The combination as set forth in claim 4 wherein said second hydrostatic unit comprises a rotor with plural pumping elements and a cam operator with two active portions whereby said second hydrostatic unit is capable of providing two pumping strokes for each revolution of its rotor with respect to its cam operator.

6. A hyperlinear power transmission mechanism having a pair of hydrostatic units situated in a closed hydrostatic circuit, each hydrostatic unit comprising a rotor, radially movable pumping elements mounted reciprocally in the rotor and a cam operator engaging said pumping elements, a driving member, a driven member, the cam operator for a first of said hydrostatic units being connected to a stationary portion of said mechanism, first clutch means for drivably connecting the cam operator for the second hydrostatic unit with the rotor for the first hydrostatic unit, second selectively engageable clutch means for connecting the rotor of said first hydrostatic unit with said driving member, said driving member being connected to the rotor of said second hydrostatic unit, said driven member being connected to the cam operator for said second hydrostatic unit, said pumping elements cooperating with their respective rotors to define a plurality of pumping chambers, and internal passage structure hydraulically connecting the chambers of one unit with the chambers of the other unit whereby said system can be adapted by engagement and disengagement of said clutches for operation with a linear characteristic during underdrive and with a hyperbolic characteristic during overdrive, the rotor for each hydrostatic unit having radially positioned pumping chambers with said radially movable pumping elements situated therein, radial ports in said rotors, the passage structure interconnecting the pumping chambers of said units having intake and exhaust regions located radially inwardly of their respective radial ports.

7. The combination as set forth in claim 1 wherein the cam operator for one of said hydrostatic units is mounted for shifting movement with respect to the axis of rotation of its respective rotor, and means for varying the displacement of said cam operator with respect to said rotor to control the displacement of one hydrostatic unit with respect to the other, the rotor for each hydrostatic unit having radially positioned pumping chambers with said pumping elements situated therein, radial ports in said rotors, the passage structure interconnecting said pumping chambers of each unit having intake and exhaust regions located radially inwardly of their respective radial ports.

8. The combination as set forth in claim 2 wherein the cam operator for said first hydrostatic unit comprises a cam ring pivotally mounted on said stationary portion of said mechanism and a fluid pressure operated servo means for adjusting said pivotally mounted cam operator with respect to the rotor of said first unit to vary the displacement of said first unit with respect to the displacement of the second unit, the displacement of said second unit being fixed, the rotor for each hydrostatic unit having radially positioned pumping chambers with said pumping elements situated therein, radial ports in said rotors, the passage structure interconnecting said pumping chambers having intake and exhaust regions located radially inwardly of their respective radial ports.

9. The combination as set forth in claim 3 wherein said servo means are adapted to adjust the cam operator for said first unit throughout a range of angular positions with respect to the axis of rotation of said first unit on each side of a position corresponding to the position at which the axis of summetry for the cam operator coincides with the axis of summetry of its rotor, the rotor for each hydrostatic unit having radially positioned pumping chambers with the pumping elements situated therein, radial ports in said rotors, the passage structure interconnecting said pumping chambers of each unit having intake and exhaust regions located radially inwardly of their respective radial ports.

10. The combination as set forth in claim 4 wherein said second hydrostatic unit comprises a rotor with plural pumping elements and a cam operator with two active portions whereby said second hydrostatic unit is capable of providing two pumping strokes for each revolution of its rotor with respect to its cam operator, the rotor for each hydrostatic unit having radially positioned pumping chambers and radially movable pumping elements situated therein, radial porting in said rotors, the passage structure interconnecting said pumping chambers of each unit having intake and exhaust regions located radially inwardly of their respective radial ports.

11. The combination as set forth in claim 5 wherein said servo means are adapted to adjust the cam operator for said first unit throughout a range of angular positions with respect to the axis of the rotor of said first unit on each side of a position corresponding to the position at which the axis of symmetry for the cam operator coincides with the axis of symmetry of its rotor and said second hydrostatic unit comprises a rotor with plural pumping elements and a cam operator with two active portions whereby said second hydrostatic unit is capable of providing two pumping strokes for each revolution of its rotor with respect to its cam operator, the rotor for each hydrostatic unit having radially positioned pumping chambers and radially movable pumping elements situated therein, radial ports in said rotors, the passage structure interconnecting said pumping chambers of each unit having intake and exhaust regions located radially inwardly of their respective radial ports.

12. A hydrostatic unit comprising a rotor, a plurality of radially disposed pumping chambers, a pumping element located in each pumping chamber, a cam ring surrounding said rotor and engageable with said pumping elements, means for eccentrically positioning said cam with respect to said rotor whereby said pumping elements are caused to reciprocate within their respective pumping chambers upon rotation of said rotor with respect to said cam ring, radial ports in said rotor, a pressure manifold located within said rotor having a high pressure port and a low pressure port situated at angularly spaced locations with respect to the axis of said rotor, said high pressure port and said low pressure port communicating alternately with each of the pumping chambers as said rotor is rotated with respect to said manifold, the region on said manifold intermediate the manifold being adapted to sealingly engage the inner peripheral surface of said rotor as the radial ports of said rotor pass thereover, a precompression valve means in said manifold for establishing communication between said high pressure port and each of said chambers during a pumping stroke at an instant prior to the instant when communication is established between said pumping chamber and said high pressure port when the pressure in said pumping chamber exceeds the pressure in said high pressure port.

13. A hydrostatic unit comprising a rotor, radial pumping chambers in said rotor, radially movable pumping elements in said chambers, a cam ring surrounding said rotor and engageable with said pumping elements, means for positioning said cam element eccentrically with respect to the axis of rotation of said rotor, a manifold in said rotor, radial ports in said rotor communicating with each chamber, a high pressure port and low pressure port in said manifold, said manifold port communicating successively with each of said radial ports as said rotor is moved with respect to said manifold, and pre-expansion valve means for establishing communication between said low pressure manifold port and each pumping chamber as the associated pumping element begins its expansion stroke at an instant prior to the instant when the associated radial port establishes fluid communication with said low pressure manifold port.

14. The combination as set forth in claim 13 wherein said manifold comprises a pressure equalizer valve means comprising a first passage extending radially outwardly through said manifold at a location intermediate the high and low pressure manifold ports, a one-way flow valve means in said passage for accommodating radial flow through said passage and inhibiting radial outflow therethrough, a cross passage interconnecting said high pressure manifold port and said low pressure manifold port, and a shuttle valve means in said cross passage for establishing selective communication between said radial passage and the manifold port of higher pressure.

15. The combination as set forth in claim 14 wherein said manifold comprises a pressure equalizer valve means comprising a first passage extending radially outwardly through said manifold at a location intermediate the high and low pressure manifold ports, a one-way flow valve means in said passage for accommodating radial flow through said passage and inhibiting radial outflow therethrough, a cross passage interconnecting said high pressure manifold port and said low pressure manifold port, and a shuttle valve means in said cross passage for establishing selective communication between said radial passage and the manifold port of higher pressure.

No references cited.

EDGAR W. GEOGHEGAN, *Primary Examiner.*

UNITED STATES PATENT OFFICE
CERTIFICATE OF CORRECTION

Patent No. 3,385,059

May 28, 1968

Richard L. Leonard et al.

It is certified that error appears in the above identified patent and that said Letters Patent are hereby corrected as shown below:

Column 5, line 45, "119" should read -- 118 --. Column 13, line 48, "manifold", second occurrence, should read -- ports --.

Signed and sealed this 24th day of March 1970.

(SEAL)
Attest:

Edward M. Fletcher, Jr.

Attesting Officer

WILLIAM E. SCHUYLER, JR.
Commissioner of Patents